UNITED STATES PATENT OFFICE.

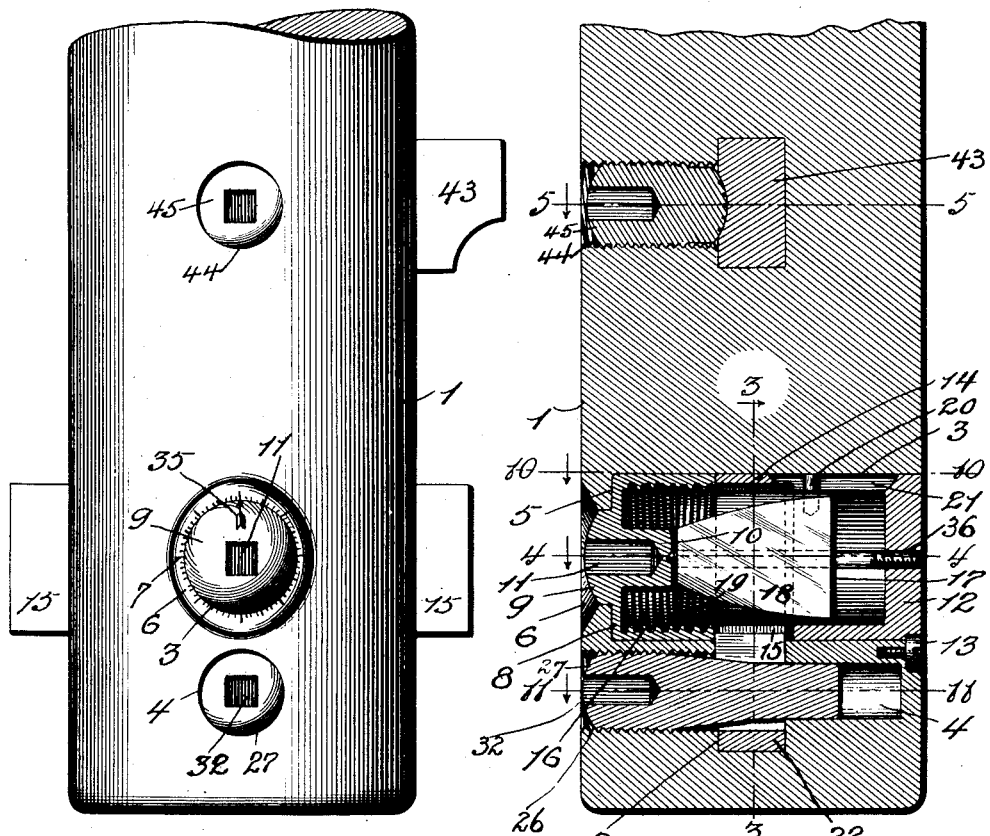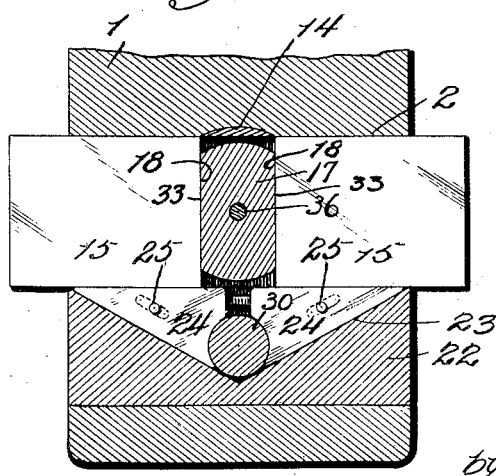

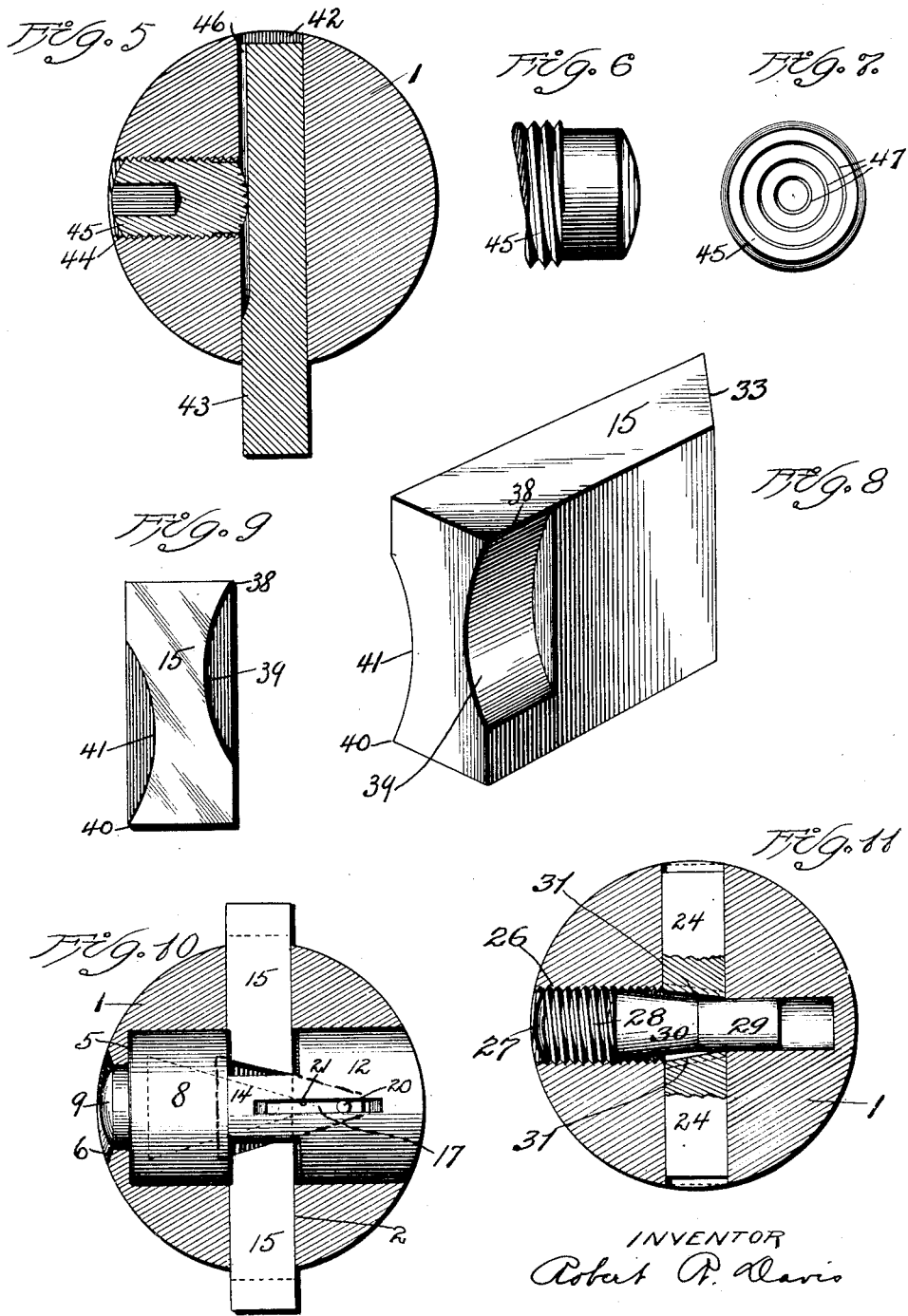

ROBERT R. DAVIS, OF ST. LOUIS, MISSOURI, ASSIGNOR TO ROBERT R. DAVIS TOOL COMPANY, OF ST. LOUIS, MISSOURI, A CORPORATION OF MISSOURI.

BORING-TOOL.

1,392,304.  Specification of Letters Patent.  Patented Oct. 4, 1921.

Application filed September 17, 1918. Serial No. 254,479.

*To all whom it may concern:*

Be it known that I, ROBERT R. DAVIS, a citizen of the United States, residing at the city of St. Louis, State of Missouri, have invented certain new and useful Improvements in Boring-Tools, of which the following is a specification, reference being had to the accompanying drawings, forming a part thereof.

This invention relates generally to boring-tools and, more particularly, to certain new and useful improvements in that class of boring-tools commonly known as expansion boring-tools, the chief objects of my present invention being to provide a simple and efficient tool of the class stated in which the cutting-blades or cutters may be readily and conveniently adjustably moved to, and releasably locked in, a desired effective working position, and to improve generally upon tools of the class mentioned.

With the above and other objects in view, my present invention resides in the provision of a tool of the class and type stated having a pair of oppositely disposed cutters or blades and means including a circumferentially threaded wedge-member interposed between the blades for adjustably moving or expanding the blades to, within the limits of the tool, any desired effective working position; in the provision of a tool of the class and type stated having means including a pair of oppositely slidable wedge-members for locking the cutters or blades in such adjusted working position, each invertible relatively to itself and in the provision of a tool of the class and type stated having double-edge cutters or blades bodily reversible relatively to the body of the tool, whereby prolonged and substantially continuous use of the cutters or blades may be had without regrinding or sharpening; and in the novel features of form, construction, arrangement, and combination of parts hereinafter described and afterward pointed out in the claims.

In the accompanying drawings,

Figure 1 is a fragmentary elevational view of a tool constructed in accordance with and embodying my invention in preferred form;

Fig. 2 is a vertical sectional view of the tool, the blades or cutters being locked, as in Fig. 1, in approximately a mid-limit position;

Fig. 3 is a detail sectional view of the tool taken approximately on the line 3—3, Fig. 2;

Fig. 4 is a similar view of the tool taken approximately on the line 4—4, Fig. 2;

Fig. 5 is a similar view taken approximately on the line 5—5, Fig. 2;

Fig. 6 is a fragmental elevation of the set or locking-screw shown in Fig. 5;

Fig. 7 is an elevational view of the working-end of the set or locking-screw shown in Fig. 6;

Fig. 8 is a perspective view of one of the cutters or blades of the tool;

Fig. 9 is an end view of the same;

Fig. 10 is a sectional view of the tool taken approximately on the line 10—10, Fig. 2, the cutters or blades and their adjusting wedge being shown in full lines in approximately fully expanded position and in dotted lines in approximately fully retracted position; and Fig. 11 is a sectional view of the tool taken approximately on the line 11—11, Fig. 2, the blade-locking members being shown in full lines in blade locking position and in dotted lines in blade releasing position.

Referring more particularly to the said drawings, in which like reference characters refer to like parts throughout the several views, 1 indicates the body of the tool, which is preferably a steel bar or rod of cylindrical formation. Formed transversely or diametrically in body 1 adjacent its one or so-called free end, is a slot 2 and bores 3 and 4, slot 2 having its greatest dimension disposed axially of the body 1 and the bores 3 and 4 being disposed at a right angle to and intersecting the slot 2.

The bore 3, as best seen in Fig. 2, is reduced within its length and preferably adjacent one end to provide an annular shoulder 5, which is beveled upon its outer face, as at 6, and provided upon the outer, beveled face 6 of shoulder 5 is a graduate scale 7, for purposes hereinafter appearing.

Mounted for rotary movement in bore 3 and abutting at its outer end against the inner face of shoulder 5, is a barrel 8. Centrally upon its outer end, barrel 8 is formed with a boss 9, which fits in the aperture of shoulder 5, as seen in Figs. 2 and 4, boss 9 being extended inwardly, as at 10, and being provided with a socket 11 preferably non-circular in shape in cross-section adapted to receive a bit or other suitable tool, not shown, for rotarily actuating the barrel 8. The barrel 8 is bodily or axially of a length substantially equal to the distance from the shoulder 5 to the near or adjacent wall of intersecting slot 2, and also in bore 3 and oppositely disposed to barrel 8, is a second or retaining barrel 12 suitably held, as by a drive-fit or a set-screw 13 seated in the body 1, against rotary movement relatively to body 1. The barrel 12, whose outer end-face, as seen especially in Fig. 4, is convexedly flush with the face of body 1, is also bodily or axially of a length substantially equal to the distance from the face of body 1 to the near or adjacent wall of intersecting slot 2; the side wall of barrel 12, however, is partly axially extended to provide an arm 14, which has a length substantially equal to the width of slot 2. This arm 14 projects across slot 2 and along that part of the wall of bore 3 which is farthest removed from bore 4 and engages with the inner end of barrel 8, as seen in Fig. 2, to normally not only hold barrel 8 against axial movement and in its described abutting position against the shoulder 5, but also the inner ends of the barrels 8 and 12 properly spaced to provide a free space therebetween for the inner portions of suitable oppositely disposed cutters or blades 15—15 which are mounted for slidable or adjustable movement in the intersecting slot 2.

The barrel 8 is internally threaded, as at 16, and disposed in the bore 3 and within the barrels 8 and 12, is a block 17, which is lengthwise or axially flattened and tapered upon opposite sides to provide converging wedge-faces 18—18, the intermediate side faces of the block 17 being arcuately convexed and partially circumferentially threaded, as at 19, to engage with the threads 16 of barrel 8. At its end opposite its threads 19, the wedge-block 17 is provided transversely with a projecting pin 20, which fits and works in a slot 21 formed lengthwise in the wall of barrel 12 and its arm 14, as seen particularly in Fig. 2. Thus, on proper rotary movement of the barrel 8, the block 17 will be axially moved or adjusted relatively to the barrels 8 and 12, the block 17 being held by the coöperating pin 20 and slot 21 against rotational movement during its axial or adjusting movements.

Suitably fixed within slot 2 and beneath the cutters or blades 15, is a gib 22 provided longitudinally in its upper face with a so-called V-shaped pocket 23, the bottom faces of pocket 23 oppositely inclining upwardly and outwardly from the center of the gib 22 toward its ends; and disposed within the gib-pocket and resting upon its oppositely disposed inclined bottom faces, is a pair of wedge-members 24—24, which are adapted to engage at their upper faces with the under faces of the cutters or blades 15—15, as seen particularly in Fig. 3. Preferably each wedge-member 24 is provided transversely with a pin 25, which fits and works in a suitable obliquely disposed slot, indicated by dotted lines in Fig. 3, in the side wall of gib-pocket 23, to prevent displacement of the wedge-members 24. As also seen in Fig. 3, the wedge-members 24 have a combined length less than the diameter of the tool-body 1, the wedge-members 24 being preferably somewhat spaced apart at their inner ends.

Bore 4 to one side of the slot 2 is threaded, as at 26, the part of bore 4 disposed upon the opposite side of the slot 2 being preferably of reduced diameter, as seen especially in Fig. 11. And disposed lengthwise in bore 4, is a wedge-adjusting pin 27 comprising a threaded portion 28 having threaded engagement with the bore-threads 26, a shank or pilot-portion 29 of reduced diameter to fit the reduced portion of bore 4, and an intermediate tapering-portion 30 adapted to engage the wedge-members 24 to spread and thereby elevate the same to engage the cutters or blades 15 to lock the latter in adjusted or expanded position relatively to the body 1. To properly coöperate with the tapering-portion 30 of the pin 27, the wedge-members 24 are correspondingly beveled, as at 31, at their inner ends. The pin 27, like the barrel 8, is provided in its head with a suitable non-circular socket 32 to receive a suitable bit or other operating tool. It will be evident that, when the pin 27 is actuated outwardly to remove its tapering portion 30 from between the wedge-members 24, the latter are free to slide inwardly upon the gib 22 and out of locking engagement with the cutters or blades 15, when the cutters or blades 15 may be adjustably set relatively to the body 1, and that when the pin 27 is actuated inwardly, its tapering portion 30 will actuate the wedge-members 24, as before stated, into engagement with the blades or cutters 15, the latter being thereby rigidly locked in adjusted or set position relatively to the body 1.

Each blade or cutter 15 is suitably beveled at its inner end, as at 33, to correspond with the beveled wedge faces 18 of the block 17, and when the blades or cutters 15 are in fully retracted or so-called normal position relatively to body 1, or in the approximate position thereof indicated by dotted lines in Fig. 10, the wedge-block 17 is disposed for the greater part within and embraced by the barrel 8 or in the position thereof also indicated by dotted lines in Fig. 10, block 17 being provided in its one end with a pocket or recess 34 to accommodate the boss-extension 10 of the barrel 8 when in such so-called normal position. The wedge-members 24 being in blade-releasing position, on barrel 8 being rotarily actuated, the wedge-block 17 will be axially moved toward barrel 12 and the blades or cutters 15 thereby expanded or moved outwardly relatively to body 1, the amount of blade movement or adjustment being conveniently and accurately gaged and determined by the indicating scale 7 upon the body 1 and its companion pointer 35 upon the head or boss 9 of the barrel 8. Thus it will be obvious that the cutters or blades 15 may be set or released by a rotation of the pin 27 and may be adjusted or expanded to any desired effective working position, within the limits of the particular tool, by a rotation of the barrel 8, the position of the cutters or blades 15 relatively to the body 1 of the tool being conveniently indicated at all times.

As an auxiliary holding-means to adjustably maintain the barrels 8 and 12 at all times properly spaced relatively to each other and in fully operative positions in the body 1, should the arm 14 become worn, I provide a holding-pin 36, illustrated especially in Fig. 2, this pin 36 being thread-seated at one end in the end wall of fixed barrel 12 and impingingly engaging at its other end with the boss-extension 10 of barrel 8. To accommodate this pin 36, the wedge-block 17 is provided with a suitable axial bore, as at 37, and preferably, as shown, the impinging inner end of pin 36 is pointed and its seat in boss-extension 10 correspondingly shaped to minimize resistance to easy rotation of the adjusting barrel 8.

Each of the cutters or blades 15, as illustrated particularly in Figs. 8 and 9, is preferably provided at one end with two working edges disposed upon opposite sides of the blade and diagonally opposite each other. One such working edge 38 is formed by milling an arcuated depression 39 in one side face of the blade, and the other such working edge 40 being similarly formed by milling an arcuated depression 41 in the opposite side face of the blade. Such depressions may be of any suitable width and arc, the greater the width the greater the length of the cutting edge, and the greater the arc of the depression, the sharper the cutting edge and also the longer the life of the cutting edge without regrinding or remilling. As will be seen particularly from Fig. 8, each such depression embraces in its arc but a portion and one edge only of the side face of the cutter or, as it might be described, the chord of the arc of each depression extends from one edge only to a point or line spaced from the opposite edge of the side face of the cutter. Such a blade or cutter may be accurately and conveniently machined, and when one cutting edge is substantially completely worn or reduced, its companion cutting edge may be conveniently substituted by a simple inversion of each cutter relatively to itself and then a body reversal of the cutters or blades 15 relatively to and in the body 1 and obviously without effect or disturbance of the indicator.

The body 1 of the present tool is also preferably provided diametrically with a slot 42 paralleling and above the slot 2 adapted to receive and accommodate an additional or auxiliary cutter 43 to adapt the tool also for reaming, beveling, and the like. Disposed in body 1 at right angles to slot 42, is an internally threaded bore 44, and threaded in the bore 44 to engage the cutter 43, is a set-screw 45. To obtain a maximum holding efficiency between the screw 45 and cutter 43, the cutter 43 is provided longitudinally with a sectionally rounded groove 46, and the inner end of the screw 45 is rounded to conform to the curvature of the groove 46, there being thus provided a relatively great contacting surface between the screw 45 and the cutter 43. And to augment the holding efficiency of the screw 45, its inner end is provided with a series of concentric channels, as at 47, whose edges serve to bite into the cutter 43 and thus tend to hold the screw 45 against rotation in a direction to prevent its withdrawal to release the cutter 43.

I am aware that changes in the form, construction, arrangement, and combination of the several parts of my new tool may be made and substituted for those herein shown and described without departing from the nature and principle of my invention.

Having thus described my invention, what I claim and desire to secure by Letters Patent is:

1. A boring-tool comprising, in combination, a body having a bore, a pair of oppositely-disposed cutters mounted for movement in the body at right angles to the bore, and means for moving the cutters outwardly relatively to the body, said means including a circumferentially threaded wedge-member located in the bore and disposed wholly within the body for axial movement between the cutters, and a member fitting for rotary movement in the bore wholly to one side of the cutters, said member being held from axial movement and having threaded engagement with the wedge-member.

2. A boring-tool comprising, in combination, a body having a bore, a pair of oppositely disposed cutters mounted for movement in the body at right angles to the bore, and means for moving the cutters outwardly relatively to the body, said means including a circumferentially threaded wedge-member located in the bore and disposed wholly within the body for axial movement between the cutters, and an internally threaded barrel fitting for rotary movement in the bore wholly to one side of the cutters, the barrel being held from axial movement and having threaded engagement with the wedge-member.

3. A boring-tool comprising, in combination, a body having a bore, a pair of oppositely-disposed cutters mounted for movement in the body at right angles to the bore, and means for moving the cutters outwardly relatively to the body, said means including a block disposed for axial, and held from rotational, movement in the bore and between the cutters, the block having a pair of converging wedge-faces and intermediate circumferentially threaded wedge-faces, and an internally threaded barrel fitting for rotary movement in the bore wholly to one side of the cutters, the barrel being held from axial movement and having threaded engagement with the threaded arcual faces of the block.

4. A boring-tool comprising, in combination, a body, a pair of oppositely-disposed cutters mounted for movement in the body, and means for moving the cutters outwardly relatively to the body, said means including an internally threaded barrel disposed for rotary, and held from axial, movement in the body, a second barrel fixed in the body and oppositely disposed to the rotary barrel, and a circumferentially threaded wedge-member disposed for axial movement within the barrels and between the cutters, the wedge-member having threaded engagement with the rotary barrel and non-rotational engagement with the fixed barrel.

5. A boring-tool comprising a body and a pair of oppositely disposed cutters mounted for movement in the body, in combination with means for moving the cutters outwardly relatively to the body, said means including an internally threaded barrel disposed for rotary and held from axial movement in the body, a second barrel fixed in the body and oppositely disposed to the rotary barrel, and a circumferentially threaded wedge-member disposed for axial movement within the barrels and between the cutters, the wedge-member having threaded engagement with the rotary barrel and slot-and-pin engagement with the fixed barrel.

6. A boring-tool comprising a body having a diametrical slot and a shouldered diametrical bore disposed at a right angle to and intersecting the slot, and a pair of oppositely-disposed cutters mounted for movement in the slot, in combination with means for moving the cutters outwardly relatively to the body, said means including an internally threaded barrel disposed for rotary movement in, and engaging the shoulder of, the bore, a second barrel fixed in the bore and oppositely disposed to and spaced from the rotary barrel, a circumferentially threaded wedge-member disposed for axial movement within the barrels and between the cutters, the wedge-member having threaded engagement with the rotary barrel and slot-and-pin engagement with the fixed barrel, and a member having engagement with both barrels for holding the rotary barrel in spaced relation from the fixed barrel.

7. A boring-tool comprising a body having a diametrical slot and a shouldered diametrical bore disposed at a right angle to and intersecting the slot, and a pair of oppositely-disposed cutters mounted for movement in the slot, in combination with means for moving the cutters outwardly relatively to the body, said means including an internally threaded barrel disposed for rotary movement in, and engaging the shoulder of, the bore, a second barrel fixed in the bore and oppositely disposed to and spaced from the rotary barrel, a circumferentially threaded wedge-member disposed for axial movement within the barrels and between the cutters, the wedge-member having threaded engagement with the rotary barrel and slot-and-pin engagement with the fixed barrel, and a rigid arm on the fixed barrel having engagement with the rotary barrel for holding the same in spaced relation from the fixed barrel.

8. A boring-tool comprising a body and a pair of oppositely disposed cutters mounted for movement in the body, in combination with means for releasably locking both cutters against movement relatively to the body, said means including a pair of wedge-members disposed in the body for movement upon the same side of the cutters, the wedge-members being oppositely slidable to each engage a cutter, and a member having engagement with the body for slidably moving the wedge-cutters.

9. A boring-tool comprising a body and a pair of oppositely disposed cutters mounted for movement in the body, in combination with means for releasably locking the cutters against movement relatively to the body, said means including a pair of wedge-members disposed wholly within the body for movement upon the same side of the cutters, the wedge-members being oppositely slidable to each engage a cutter, and a single member having engagement with the body and disposed between the wedge-members for oppositely moving the wedge-members to engage their respective cutters.

10. A boring-tool comprising a body and a pair of oppositely-disposed cutters mounted for movement in the body, in combination with means for releasably locking both cutters against movement relatively to the body, said means including a pair of wedge-members disposed wholly within the body and oppositely slidable to engage the cutters, and a wedge-screw mounted in the body for slidably moving both wedge-members to engage the cutters.

11. A boring-tool comprising, in combination, a body, a pair of oppositely-disposed cutters mounted for slidable movement in the body, and means for simultaneously locking both cutters against movement relatively to the body, said means including a gib fixed in the body, the gib being provided with a V-shaped pocket, a pair of wedge-members mounted and oppositely movable in the gib-pocket, the wedge-members being adapted for engagement with the cutters, and a wedge-screw mounted in the body and adapted for simultaneous actuation of both wedge-members.

12. A boring-tool including a cutter substantially rectangular in section at its working end, the cutter being provided with a transverse arcuated depression upon a side face and at said end and thereby formed with a cutting edge, the chord of the arc of the depression extending from one edge only to a point spaced from the opposite side edge of said side face.

13. A boring-tool including a cutter substantially rectangular in section at its working end, the cutter being provided with transverse arcuated depressions upon two of its opposite side faces and at said end and thereby formed with diagonally opposite cutting edges, the chords of the arcs of said depressions extending from one edge only to a point spaced from the opposite side edge of the respective side faces.

14. A boring-tool including a body, in combination with a pair of oppositely-disposed cutters mounted removably in the body, each cutter being beveled at its inner end and each at its working end provided with transverse arcuated depressions upon opposite faces and thereby formed with diagonally opposite cutting edges, the chords of the arcs of said depressions extending from one edge only to a point spaced from the opposite side edge of the respective side faces, the cutters being bodily reversible relatively to the body and each invertible relatively to itself to interchangeably present the opposite cutting edges of each cutter to the work.

In testimony whereof I have signed my name to this specification.

ROBERT R. DAVIS.